United States Patent
Annis et al.

(10) Patent No.: US 8,616,763 B2
(45) Date of Patent: *Dec. 31, 2013

(54) STAND MIXER WIPING BEATER WITH ADDITIONAL FEATURES

(75) Inventors: James Stacy Annis, Stevensville, MI (US); Arren J. McCormick, Benton Harbor, MI (US); Jeremy T. Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/241,371

(22) Filed: Sep. 23, 2011

(65) Prior Publication Data

US 2012/0081993 A1    Apr. 5, 2012

Related U.S. Application Data

(60) Provisional application No. 61/390,007, filed on Oct. 5, 2010.

(51) Int. Cl.
*B01F 7/00* (2006.01)

(52) U.S. Cl.
USPC .......................................................... 366/312

(58) Field of Classification Search
USPC ................. 366/130, 342, 241, 129, 296, 309
See application file for complete search history.

(56) References Cited

U.S. PATENT DOCUMENTS

| | | | |
|---|---|---|---|
| 60,330 A | 12/1866 | Brand et al. | |
| 176,775 A | 5/1876 | Croft | |
| 290,033 A | 12/1883 | Ginn | |
| 683,474 A | 10/1901 | Mackinzie | |
| D55,815 S | 7/1920 | Pinkey | |
| 1,415,735 A | 5/1922 | Trust et al. | |
| 1,612,281 A | 11/1922 | Goetz | |
| 1,674,903 A | 6/1928 | Johnston et al. | |
| 1,826,242 A | 10/1931 | Dehuff | |
| 1,862,181 A * | 6/1932 | Emmons | 366/197 |
| 1,872,004 A | 8/1932 | Rataiczak et al. | |
| 2,027,756 A | 1/1936 | Tay | |
| 2,178,269 A | 10/1939 | Seybert | |
| 2,181,078 A | 11/1939 | Dehuff | |
| D119,842 S | 4/1940 | Anstice | |
| D134,247 S | 11/1942 | Moeller | |
| 2,306,245 A | 12/1942 | Duke | |
| 2,318,534 A * | 5/1943 | Seybert | 366/312 |
| 2,482,587 A * | 9/1949 | Hughes | 416/70 R |
| 2,562,790 A | 7/1951 | Houston, Jr. | |

(Continued)

FOREIGN PATENT DOCUMENTS

| | | |
|---|---|---|
| DE | 10242242 A1 | 3/2004 |
| EP | 0406679 A1 | 1/1991 |
| WO | 2006083560 A2 | 8/2006 |

OTHER PUBLICATIONS

Reexam of U.S. Patent No. 7,314,308, Control No. 90/010575, Fallowes, Date: Dec. 27, 2010.

*Primary Examiner* — Tony G Soohoo
*Assistant Examiner* — Anshu Bhatia

(57) ABSTRACT

A mixing beater for a stand mixer includes a metallic frame having an arm, a plastic shell extending over the arm, and a scraper that extends over the plastic shell. The scraper has a wiping blade configured to contact an inner surface of a mixing bowl of the stand mixer.

20 Claims, 14 Drawing Sheets

(56) References Cited

U.S. PATENT DOCUMENTS

| | | | |
|---|---|---|---|
| 2,574,391 A | 11/1951 | Herrly | |
| 2,753,160 A | 7/1956 | Gunn, Sr. | |
| 2,793,012 A | 5/1957 | Wolf | |
| 3,073,579 A | 1/1963 | Detrick | |
| 3,415,497 A * | 12/1968 | Johnson | 366/247 |
| 3,914,956 A | 10/1975 | Knight | |
| 4,183,680 A | 1/1980 | Manfroni | |
| 4,190,371 A | 2/1980 | Durr et al. | |
| 4,197,018 A | 4/1980 | Groen, Jr. | |
| 4,337,000 A | 6/1982 | Lehmann | |
| 4,525,072 A | 6/1985 | Giusti | |
| 4,613,086 A | 9/1986 | Granum et al. | |
| 4,854,717 A | 8/1989 | Crane et al. | |
| 4,944,600 A | 7/1990 | McKelvey | |
| 4,946,285 A | 8/1990 | Vennemeyer | |
| 5,009,510 A | 4/1991 | Gabriele | |
| 5,208,939 A * | 5/1993 | Oulie | 15/245 |
| 5,556,201 A | 9/1996 | Veltrop et al. | |
| 5,568,976 A | 10/1996 | Gabriele | |
| 5,644,926 A * | 7/1997 | Kress | 62/342 |
| 5,791,777 A | 8/1998 | Mak | |
| 5,911,505 A | 6/1999 | St. John et al. | |
| 5,975,753 A | 11/1999 | Meyer | |
| D421,030 S | 2/2000 | Panaccione et al. | |
| 6,652,137 B1 | 11/2003 | Bosch et al. | |
| D488,956 S | 4/2004 | Boyle et al. | |
| 6,866,413 B2 | 3/2005 | Donthnier et al. | |
| 6,932,503 B2 | 8/2005 | Fallowes | |
| 7,217,029 B2 * | 5/2007 | Grandjean | 366/287 |
| 7,270,473 B2 | 9/2007 | Donthnier et al. | |
| 7,314,308 B2 | 1/2008 | Fallowes et al. | |
| 2006/0171251 A1 | 8/2006 | Busick | |
| 2006/0209629 A1 | 9/2006 | Fallowes et al. | |
| 2006/0268659 A1 | 11/2006 | Kaas | |

* cited by examiner

STAND MIXER WIPING BEATER WITH ADDITIONAL FEATURES

The present application claims the benefit, under 35 U.S.C. §119(e), of U.S. Provisional Application No. 61/390,007, which was filed Oct. 5, 2010 and is incorporated by reference herein.

CROSS-REFERENCE

Cross-reference is made to co-pending U.S. Design patent application Ser. No. 29/376,285 entitled "Wiping Beater," which was filed by J. Stacy Annis et al. on Oct. 5, 2010 and co-pending U.S. Utility patent application Ser. No. 12/898,008 entitled "Stand Mixer Wiping Beater," which was filed by J. Stacy Annis et al. on Oct. 5, 2010, each of which is incorporated herein by reference.

TECHNICAL FIELD

The present disclosure relates generally to stand mixer appliance. The present disclosure relates more particularly to a mixing beater for a stand mixer.

BACKGROUND

A portable appliance, or small appliance, such as a stand mixer, is a device that may be used in the preparation of meals and other foodstuffs. Typically, stand mixers are intended to be used on tabletops, countertops, or other platforms. Many stand mixers include a motor and electronics to control the operation of the motor and a mixing element. Illustrative examples of such mixing elements include mixing beaters, dough hooks, and wire whips.

SUMMARY

According to one aspect, a mixing beater for a stand mixer is disclosed. The mixing beater includes a metallic frame including an arm, a rigid plastic shell extending over the arm, and only one scraper. The one scraper extends over the rigid plastic shell and has a flexible blade configured to contact an inner surface of a mixing bowl when viewed in a first plane.

In some embodiments, the one scraper may be formed from a thermoplastic elastomer. In some embodiments, the rigid plastic shell may be formed from polypropylene. Additionally, in some embodiments, the metallic frame may be formed from aluminum.

In some embodiments, the metallic frame may include a central shaft defining an axis, and the arm may extend from the central shaft. In some embodiments, the arm may extend parallel to the axis when viewed in a second plane extending orthogonally to the first plane. Additionally, in some embodiments, an angle may be defined between the arm and the axis when viewed in the first plane.

In some embodiments, the flexible blade may have a curved edge configured to contact the inner surface of the mixing bowl. The curved edge may be tapered when viewed in a second plane extending orthogonally to the first plane.

According to another aspect, a stand mixer is disclosed. The stand mixer includes a mixing bowl including an inner surface and a beater positioned in the mixing bowl. The beater includes a metallic frame, a rigid plastic shell molded to the metallic frame, and only one scraper molded to the rigid plastic shell. The one scraper is formed from a thermoplastic elastomer and has a curved flexible blade configured to contact the curved inner surface of the mixing bowl.

In some embodiments, the metallic frame may include a central shaft and a first arm extending from the central shaft. The one scraper may extend over the first arm. In some embodiments, the central shaft may define an axis, and the first arm may extend parallel to the axis when viewed in a first plane.

In some embodiments, the metallic frame may include a second arm extending from the central shaft and parallel to the axis when viewed in the first plane.

According to another aspect, the stand mixer includes a mixer head having a drive shaft, a mixing bowl positioned under the drive shaft, and a beater configured to be coupled to the drive shaft. The mixing bowl includes an inner surface. The beater includes a metallic frame including a first arm extending in a first direction and a second arm extending in a second direction, a rigid plastic shell extending over the first arm, and only one scraper. The one scraper extends over the rigid plastic shell, is formed from a thermoplastic elastomeric, and has a flexible blade configured to contact the inner surface of the mixing bowl.

According to another aspect, a mixing beater for a stand mixer is disclosed. The mixing beater includes a metallic frame including an arm, a plastic shell extending over the arm, and only one scraper. The one scraper includes a cover piece extending over the plastic shell and a wiping blade extending from the cover piece. The wiping blade is configured to contact an inner surface of a mixing bowl. The wiping blade includes a base secured to the cover piece, a curved outer edge spaced apart from the base, a first surface extending between the base and the curved outer edge, and a rib extending outwardly from the first surface.

In some embodiments, the wiping blade may include at least three ribs extending from the first surface. In some embodiments, the rib may have a semi-circular cross-section. Additionally, in some embodiments, the curved outer edge of the wiping blade may define a first curved imaginary line when the mixing beater is viewed in a first plane. The rib may include a tip that defines a second curved imaginary line extending parallel to the first curved imaginary line when the mixing beater is viewed in the first plane.

In some embodiments, the metallic frame may include a central shaft having the arm attached thereto. The central shaft may be configured to be coupled to the stand mixer. A first longitudinal axis may extend through the central shaft and a second longitudinal axis may extend through the wiping blade. An angle may be defined between the first longitudinal axis and the second longitudinal axis when the mixing beater is viewed in a second plane that extends orthogonal to the first plane.

In some embodiments, the first longitudinal axis may extend parallel to the second longitudinal axis when the mixing beater is viewed in the second plane. In some embodiments, the angle may have a magnitude that is greater than zero degrees. Additionally, in some embodiments, a third longitudinal axis may extend through the arm of the metallic frame, and the third longitudinal axis may extend parallel to the first longitudinal axis when the mixing beater is viewed in the second plane.

In some embodiments, the plastic shell may include a casing positioned within the cover piece of the one scraper, and a beam extending from the casing. The beam may have an edge positioned within the wiping blade.

In some embodiments, the wiping blade may include a pre-molded body that has a bowed cross-section. In some embodiments, the one scraper may be formed from a thermoplastic elastomer. Additionally, in some embodiments, the plastic shell may be formed from polypropylene, and, in some embodiments, the metallic frame may be formed from aluminum.

According to another aspect, a mixing beater for a stand mixer is disclosed. The mixing beater includes a metallic frame including an arm, a plastic shell, and a scraper. The shell includes a casing extending over the arm and a beam that extends from the casing. The scraper includes a cover piece that extends over the casing of the plastic shell and a wiping blade that extends from the cover piece. The wiping blade has a first surface configured to contact an inner surface of a mixing bowl. The beam of the shell has an edge positioned within the wiping blade to reinforce the wiping blade.

In some embodiments, the wiping blade may include a pre-molded body having a base attached to the cover piece and an outer edge, and the edge of the beam of the shell may be positioned between the base and the outer edge of the wiping blade. Additionally, in some embodiments, the pre-molded body may have a bowed cross-section. In some embodiments, the wiping blade may include a plurality of ribs extending outwardly from the first surface.

In some embodiments, the wiping blade may have a lower body and an upper body. The upper body may define an arc such that a section of the first surface is concave when the mixing beater is viewed in a first plane.

According to another aspect, a mixing beater for a stand mixer is disclosed. The mixing beater includes a metallic frame, a plastic shell, and a scraper. The frame includes a central shaft configured to be coupled to the stand mixer and an arm attached to the central shaft. The plastic shell extends over the arm, and the scraper extends over the plastic shell. The scraper includes a wiping blade. A first longitudinal axis extends through the central shaft, a second longitudinal axis extends through the wiping blade, and a third longitudinal axis extends through the arm. An angle having a magnitude greater than zero degrees is defined between the first longitudinal axis and the second longitudinal axis when the mixing beater is viewed in a first plane. The first longitudinal axis extends parallel to the third longitudinal axis.

In some embodiments, the plastic shell may include a casing positioned within the scraper, and a beam extending from the casing. The beam has an edge positioned within the wiping blade.

BRIEF DESCRIPTION OF THE DRAWINGS

The detailed description particularly refers to the following figures, in which.

DETAILED DESCRIPTION OF THE DRAWINGS

Figure 1:
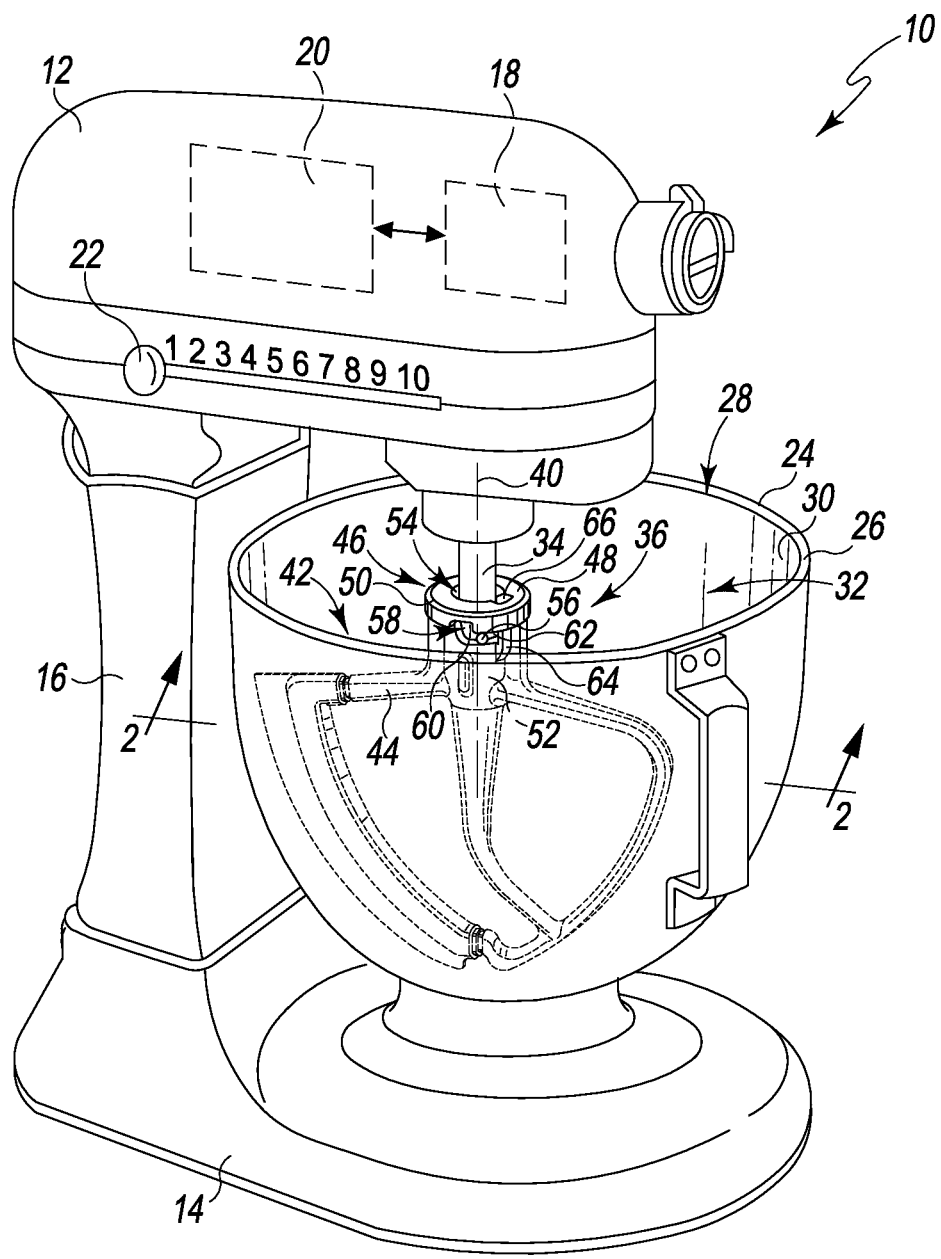
FIG. 1 is a perspective view of one embodiment of a mixing beater positioned in a mixing bowl of a stand mixer.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a stand mixer appliance 10 (hereinafter "stand mixer") is shown in FIG. 1. The stand mixer 10 has a mixer head 12, a base 14, and an upstanding pedestal 16 extending upwardly from the base 14. The pedestal 16 supports the mixer head 12, which encases a motor 18 and associated electronic motor controls 20. In some embodiments, the motor 18 and/or the motor controls 20 may be alternatively located in any part of the base 14, including the upstanding pedestal 16. As shown in FIG. 1, the stand mixer 10 is a bowl-lift stand mixer, such as, for example, the KP-26 Stand Mixer available from KitchenAid® of St. Joseph, Mich. In other embodiments, the stand mixer may be, for example, a tilt-head stand mixer such as the KSM150 Stand Mixer available from KitchenAid® of St. Joseph, Mich.

A user control 22 is also included on the stand mixer 10. The user control 22 is illustratively embodied in FIG. 1 as a sliding speed control knob 22 mounted in the mixer head 12. The user may choose a desired speed setting with the control knob 22, and the motor controls 20 will generally attempt to operate the motor 18 at the desired speed. As shown in FIG. 1, the sliding speed control knob 22 is configured for multiple discrete speeds, indexed from 0 to 10, with an increment of 1. It will be appreciated that in other embodiments the user control 22 may be any type of analog or digital user interface operable to input a desired speed setting for the stand mixer 10.

The stand mixer 10 includes a mixing bowl 24, which is supported on the base 14. The mixing bowl 24 includes a sidewall 26 extending downwardly from a circular opening 28. The sidewall 26 includes a curved inner surface 30 that defines a mixing chamber 32. It will be appreciated that in other embodiments all or part of the inner surface 30 of the bowl 24 may straight rather than curved. As shown in FIG. 1, the mixing chamber 32 of the mixing bowl 24 is positioned below a drive shaft 34 extending downwardly from the mixer head 12.

A mixing beater 36 is releasably attached to the drive shaft 34 for rotation thereby. The mixing beater 36 mixes foodstuffs and other items in the mixing bowl 24. In the illustrative embodiment, the motor 18 is configured to provide motive power to the mixing beater 36 via a planetary gear system. The use of the planetary gear system creates a complex rotational motion for the mixing beater 36 because the mixing beater 36 orbits around a rotation axis 38 (see FIG. 2) of a sun gear and rotates along a rotation axis 40 extending through the drive shaft 34.

As shown in FIGS. 1-4, the mixing beater 36 is embodied as a wiping beater 42. The beater 42 includes a frame 44 formed from die cast aluminum alloy. It will be appreciated that in other embodiments the frame 44 may be formed from other suitable metallic materials such as, for example, stainless steel. In the illustrative embodiment, the frame 44 is cast as a single monolithic component, but it will be appreciated that in other embodiments the frame 44 may be an assembly formed from multiple components.

Figure 2:
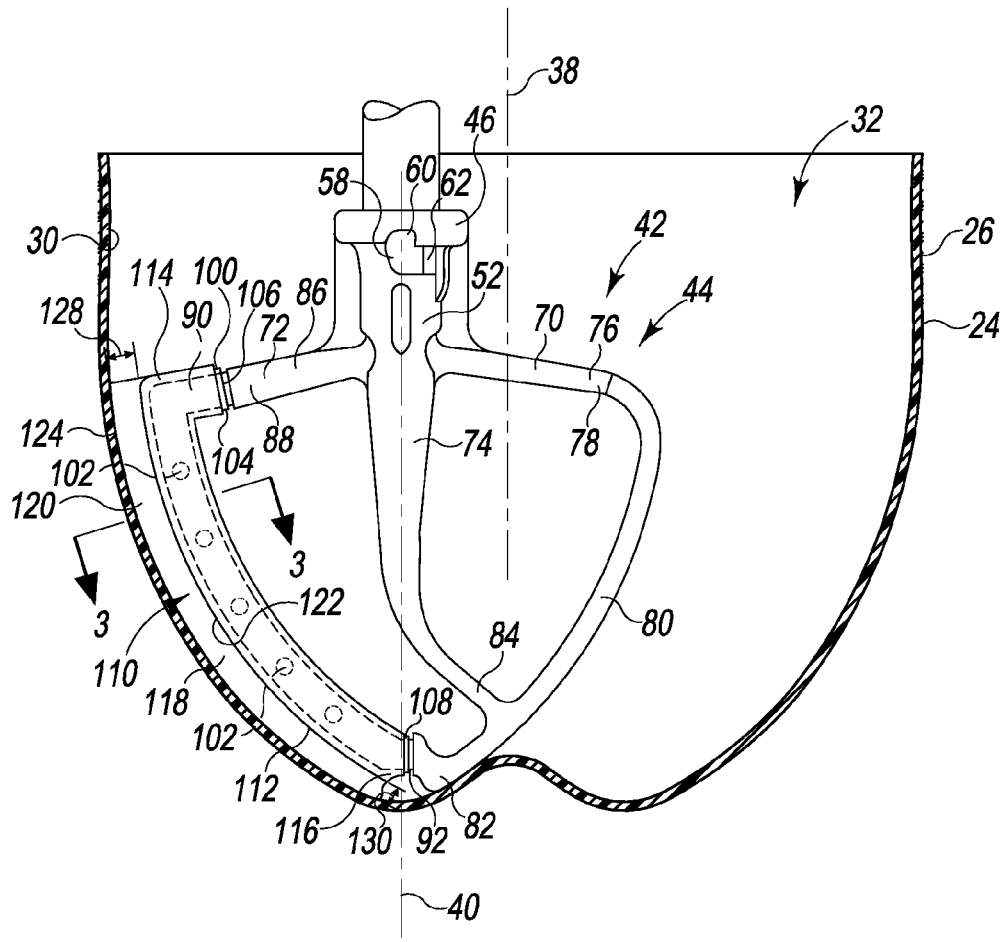
FIG. 2 is a cross-section elevation view of the mixing bowl taken along the line 2-2 shown in FIG. 1.

The frame 44 of the mixing beater 36 includes a collar 46 removably secured to the drive shaft 34 of the mixer head 12. The collar 46 has a central shaft 48 that includes an upper end 50 to a lower end 52. As shown in FIGS. 1 and 2, the rotation axis 40 of the drive shaft 34 extends through the central shaft 48. The central shaft 48 has a bore 54 defined therein that extends downwardly from the upper end 50. As shown in FIG. 1, the bore 54 is sized to receive the drive shaft 34 of the mixer head 12. A locking pin 56 extending outwardly from the drive shaft 34 is received in a slot 58 formed in the central shaft 48.

To detach the beater 42 from the drive shaft 34, the user presses the beater 42 upward to advance the pin 56 along a first vertical segment 60 of the slot 58. The user rotates the collar 46 relative to the drive shaft 34, thereby moving the pin 56 along a horizontal segment 62 of the slot 58 to an end 64, as shown in FIG. 1. After the pin 56 has been moved to the end 64 of the slot 58, the user may pull the beater 42 downward, which advances the pin 56 along a second vertical segment 66 of the slot 58, thereby allowing the user to remove the beater 42 from the drive shaft 34. It will be appreciated that in other embodiments the slot 58 may include additional or fewer segments than those shown in FIG. 1.

Referring now to FIG. 2, the beater 42 is shown positioned in the mixing chamber 32 of the mixing bowl 24. The frame 44 includes a pair of arms 70, 72 and a support rib 74 extending from the lower end 52 of the collar 46. The arms 70, 72 extend from the collar 46 in opposing directions. It will be appreciated that in other embodiments the frame 44 may include additional or fewer arms.

The arm 70 of the beater 42 includes an upper branch 76 extending outwardly from the collar 46 to an end 78. The arm 70 also includes a branch 80 that extends downwardly from the end 78 to a tip 82. The curvature of the branch 80 of the arm 70 corresponds to the curved inner surface 30 of the mixing bowl 24. It will be appreciated that in some embodiments the branch 80 may be straight rather than curved.

The support rib 74 of the beater 42 extends downwardly from the collar 46 to a lower end 84 secured to the branch 80 near the tip 82. It will be appreciated that additional support ribs may be added to increase the rigidity of the frame 44. Additionally, one or more support ribs may be attached to one or both of the arms 70, 72. It should be further appreciated that one or more of the support ribs may be attached to the arms 70, 72 at other points thereon.

The arm 72 of the beater 42, like the arm 70, includes an upper branch 86 extending outwardly from the collar 46 to an end 88. The arm 72 also includes another branch 90 that extends from the end 88 to a tip 92. The curvature of the branch 90 of the arm 72 also corresponds to the curved inner surface 30 of the mixing bowl 24. In other embodiments, the branch 90 may straight rather than curved. As shown in FIG. 2, the tip 92 of the arm 72 is connected to the tip 82 of the other arm 70. It should be appreciated that in other embodiments the tips 82, 92 may be free ends that are not connected directly together.

Figure 3:
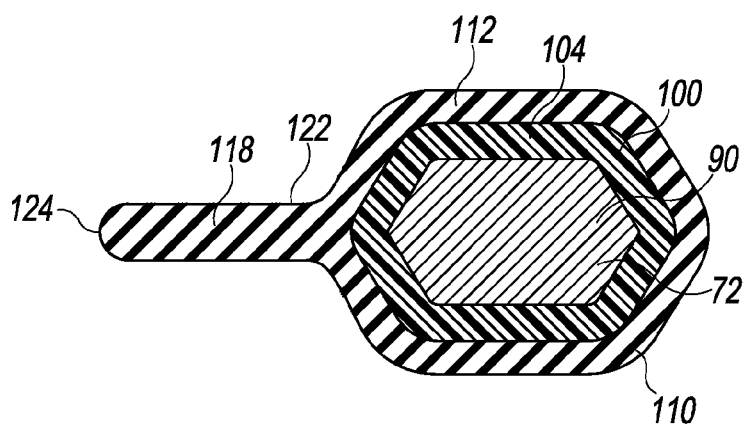
FIG. 3 is a cross-section view of the mixing beater taken along the line 3-3 shown in FIG. 2.

As shown in FIGS. 2 and 3, the beater 42 includes a shell 100 injection molded over the branch 90 of the arm 72. The branch 90 of the arm 72 has a plurality of holes 102 defined therein, and the shell 100 is formed from a polymeric or plastic material that flows over the arm 72 and into the holes 102 during the injection molding process. When the plastic material cools, a rigid outer casing 104 of the shell 100 is formed, and the shell 100 is secured to the arm 72. In other embodiments, the arm 72 may include pockets in addition to, or in place of, the holes 102, which receive the plastic material. It will also be appreciated that in other embodiments the arm 72 may not have pockets, holes, or any other opening formed along the length thereof. As shown in FIG. 2, the casing 104 of the shell 100 extends from an upper end 106 positioned adjacent to the end 88 of the upper branch 86 of the arm 72 to a lower end 108 positioned adjacent to the tip 92 of the branch 90.

The plastic material of the shell 100 is a thermoplastic polymer having sufficient strength and rigidity to withstand the loads applied to the mixing beater 42 during operation. In the illustrative embodiment, the shell 100 is formed from polypropylene. It should be appreciated that in other embodiments the shell 100 may be formed from high density polyethylene (HDPE) or nylon.

As shown in FIG. 3, the shell 100 is positioned between the arm 72 and a scraper 110. The scraper 110 is formed from a thermoplastic elastomer such as, for example, Santoprene™ thermoplastic vulcanizate (TPV), which is commercially available from Exxon Mobil Chemical Company of Houston, Tex., U.S.A. It will be appreciated that in other embodiments other thermoplastic elastomers may be used. The scraper 110 has a cover piece 112 that is secured to the shell 100 and extends over the branch 90 of the arm 72 from an upper end 114 to a lower end 116. The cover piece 112 of the scraper 110 is molded to the shell 100 such that a mechanical bond is formed between the shell 100 and the scraper 110. In that way, the scraper 110 is secured to the frame 44 via the shell 100.

The scraper 110 of the beater 42 includes a wiping blade 118 extending outwardly from the cover piece 112. The wiping blade 118 has a body 120 including a base 122 attached to the cover piece 112 and a curved edge 124. The edge 124 of the blade 118 is shaped to correspond to and follow the inner surface 30 of the mixing bowl 24. In other embodiments, the shape of the edge 124 may vary from the shape of the inner surface 30 of the mixing bowl 24.

The blade 118 includes a wiping surface 126 that extends from the base 122 to the edge 124. As shown in FIG. 2, the blade 118 is tapered along its length such that the wiping surface 126 has a width 128 at the upper end 114 of the scraper 110, which gradually decreases to a more narrow width 130 at the lower end 116. In other embodiments, the width 128 at the upper end 114 of the scraper may be less than the width 130 at the lower end 116, i.e., the blade 118 may be tapered in the opposite direction from that shown in FIG. 2. Additionally, in other embodiments, the degree or amount of taper may be different from that shown in FIG. 2. It will also be appreciated that in other embodiments the width of the blade 118 may be consistent along the length of the blade 118.

Figure 4:
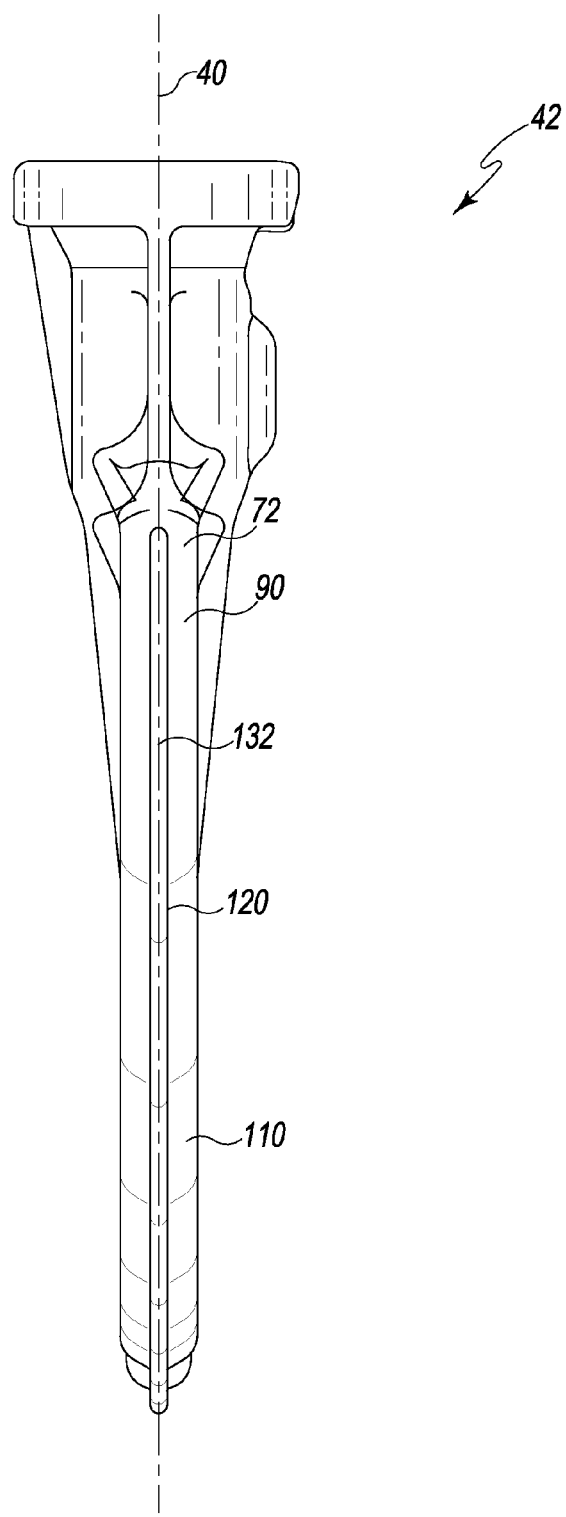
FIG. 4 is a side elevation view of the mixing beater of FIGS. 1-3.

Referring now to FIG. 4, the beater 42 is shown in a view that is orthogonal to the view shown in FIG. 2. A longitudinal axis 132 defined by the branch 90 is shown extending through the arm 72. The longitudinal axis 132 extends parallel to the rotation axis 40 extending through the central shaft 48 of the beater 42. In other words, the branch 90 of the arm 72 extends parallel to the rotation axis 40. The branch 80 (not shown) of the arm 70 similarly extends parallel to the rotation axis 40. Additionally, as shown in FIG. 4, the edge 124 of the scraper 110 is aligned with the rotation axis 40 and the longitudinal axis 132.

In use, the complex rotational motion of the beater 42 created by the planetary gear system periodically brings the edge 124 of the scraper 110 into contact with inner surface 30 of the mixing bowl 24 (see FIG. 2). The blade 118 may deflect as the edge 124 of the blade 118 advances into contact with the inner surface 30 of the mixing bowl 24, thereby also bringing the wiping surface 126 into contact with the inner surface 30. As the beater 42 is rotated about the rotation axis 40, the blade 118 passes along a portion of the inner surface 30, and the scraper 110 removes food particles from the inner surface 30. This wiping action of the scraper 110 prevents food particles from remaining on the inner surface 30 and enhances the mixing of the foodstuffs within the mixing bowl 24. It will be appreciated that in other embodiments the scraper 110 may enhance the mixing of the food stuffs when the edge 124 of the scraper 110 passes very close to the inner surface 30 of the mixing bowl 24. In such embodiments, the edge 124 may or may not contact the inner surface 30.

Referring now to FIGS. 5-16, a number of other embodiments of a mixing beater for the stand mixer 10 are shown. Some features of the embodiments illustrated in FIGS. 5-16 are substantially similar to those discussed above in reference to the embodiment of FIGS. 1-4. Such features are designated in FIGS. 5-16 with the same reference numbers as those used in FIGS. 1-4.

Figure 5:
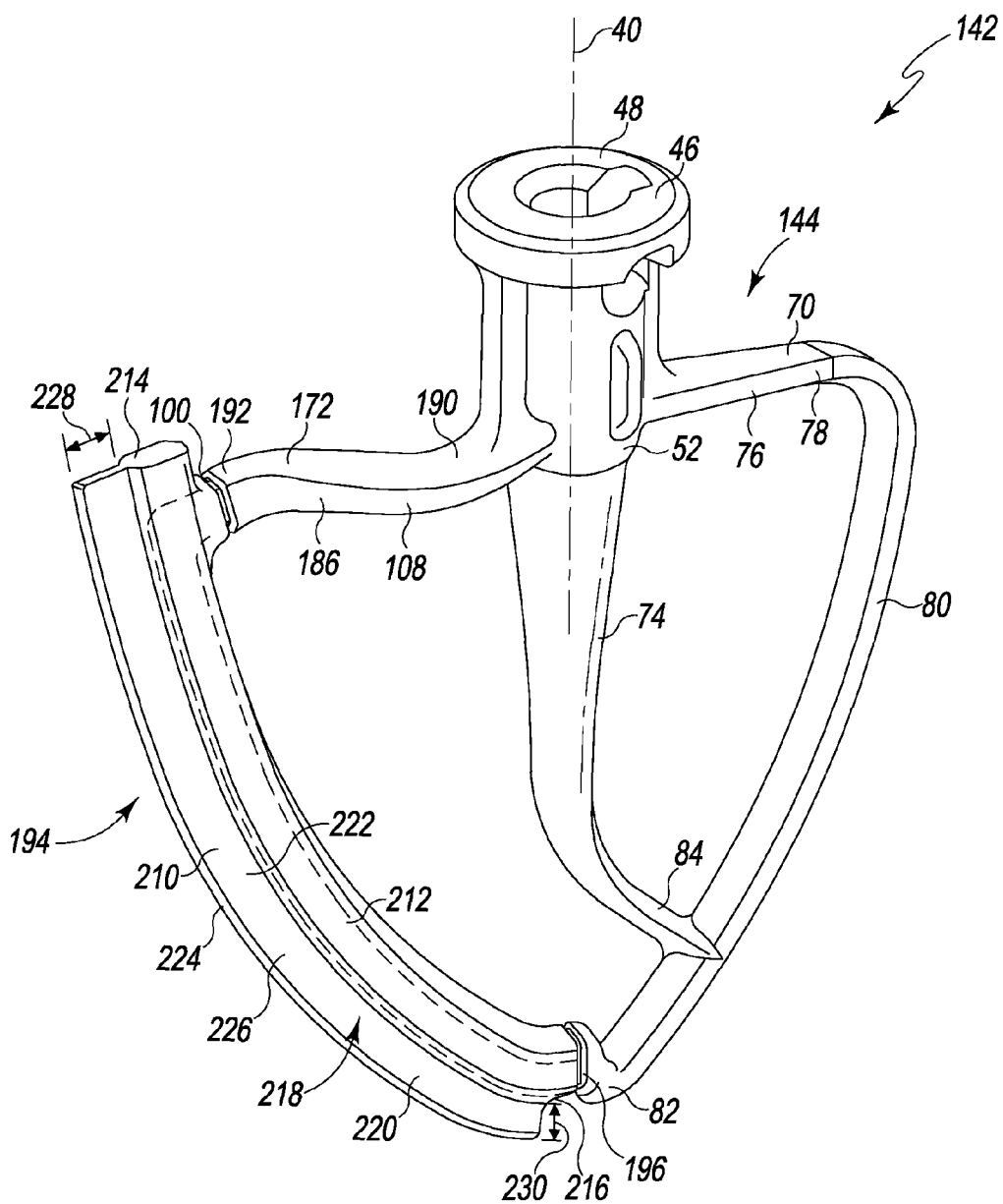
FIG. 5 is a perspective view of another embodiment of the mixing beater.

Referring now to FIG. 5, a wiping beater 142 is shown. The wiping beater 142 has a frame 144 formed from die cast aluminum alloy. The frame 144 includes a collar 46 that is configured to be removably secured to the drive shaft 34 of the mixer head 12. The rotation axis 40 of the beater 142 extends downwardly through a central shaft 48 of the collar 46.

The frame 144 also includes a pair of arms 70, 172 and a support rib 74 extending from a lower end 52 of the collar 46. The arm 70 includes an upper branch 76 extending outwardly from the collar 46 to an end 78. The arm 70 also includes a branch 80 that extends downwardly from the end 78 to a tip 82. The curvature of the branch 80 of the arm 70 corresponds to the curved inner surface 30 of the mixing bowl 24. The support rib 74 extends downwardly from the collar 46 to a lower end 84 secured to the branch 80 near the tip 82.

The arm 172 of the frame 144 includes an upper branch 186 having a body 188 extending from an end 190 secured to the collar 46 to an end 192. As shown in FIG. 5, the body 188 of the upper branch 186 is curved between the ends 190, 192 such that the end 192 is offset from the end 190. The arm 172 also includes another branch 194 secured to the end 192 and extending downwardly to a tip 196. The tip 196 of the arm 172 is connected to the tip 82 of the arm 70. The curvature of the branch 194 of the arm 172 corresponds to the curved inner surface 30 of the mixing bowl 24.

The beater 142 also includes a shell 100 injection molded to the branch 194 of the arm 172 and positioned between the arm 172 and a scraper 210. Like the scraper 110, the scraper 210 is formed from a thermoplastic elastomer. The scraper 210 has a cover piece 212 that is secured to the shell 100. The cover piece 212 extends from an upper end 214 positioned above the upper branch 186 of the arm 172 to a lower end 216. The cover piece 212 of the scraper 210 is molded onto the shell 100 such that a mechanical bond is formed between the shell 100 and the scraper 210. In that way, the scraper 210 secured to the frame 144 via the shell 100.

The scraper 210 includes a wiping blade 218 extending outwardly from the cover piece 212. The wiping blade 218 has a body 220 including a base 222 attached to the cover piece 212 and a curved edge 224. The edge 224 of the blade 218 is shaped to correspond to and follow the inner surface 30 of the mixing bowl 24. The blade 218 includes a wiping surface 226 that extends from the base 222 to the edge 224. The blade 218 is tapered along its length such that the wiping surface 226 has a width 228 at the upper end 214 of the scraper 210, which gradually decreases to a more narrow width 230 at the lower end 216.

Figure 6:
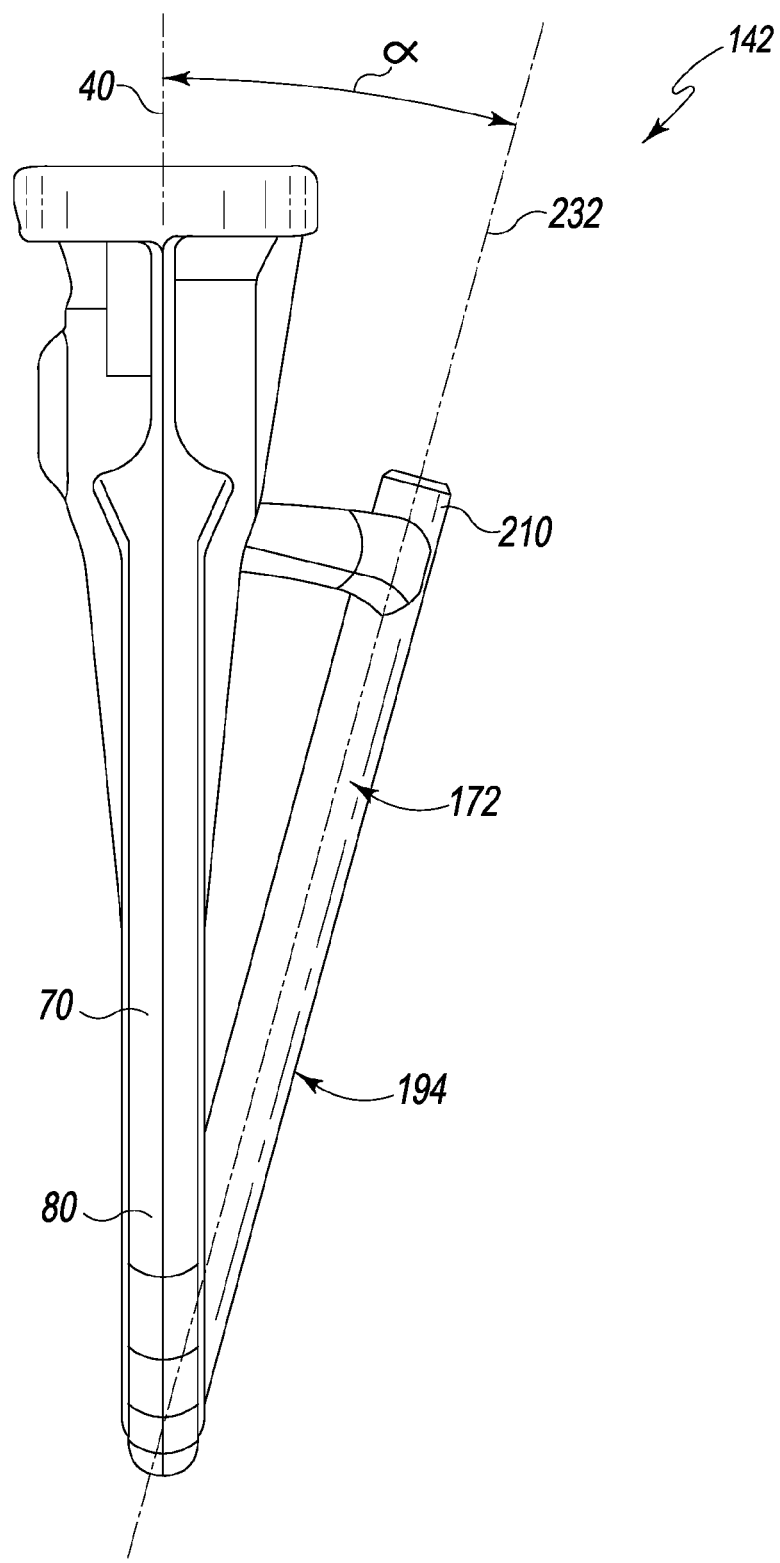
FIG. 6 is a side elevation view of the mixing beater of FIG. 5.

Referring now to FIG. 6, one side of the beater 142 is shown. A longitudinal axis 232 defined by the branch 194 extends through the arm 172. In that view, an angle α is defined between the longitudinal axis 232 of the arm 172 and the rotation axis 40 such that the scraper 210 is angled downward. In that way, an angle is defined between the arm 172 and the rotation axis 40. In the illustrative embodiment, the magnitude of the angle α is approximately 15 degrees. While the branch 194 of the arm 172 is angled related to the rotation axis 40, the branch 80 of the arm 70 extends parallel to the rotation axis 40.

In use, the complex rotational motion of the beater 142 created by the planetary gear system periodically brings the edge 224 of the scraper 210 into contact with inner surface 30 of the mixing bowl 24. The blade 218 may deflect as the edge 224 of the blade 218 advances into contact with the inner surface 30 of the mixing bowl 24, thereby also bringing the wiping surface 226 into contact with the inner surface 30. As the beater 142 is rotated about the rotation axis 40, the blade 218 passes along a portion of the inner surface 30, and the scraper 210 removes food particles from the inner surface 30. Because the scraper 210 is angled downward, food particles are pushed downward and toward the center of the mixing bowl 24. The wiping action of the scraper 210 prevents food particles from remaining on the inner surface 30 and enhances the mixing of the foodstuffs within the mixing bowl 24.

Figure 7:
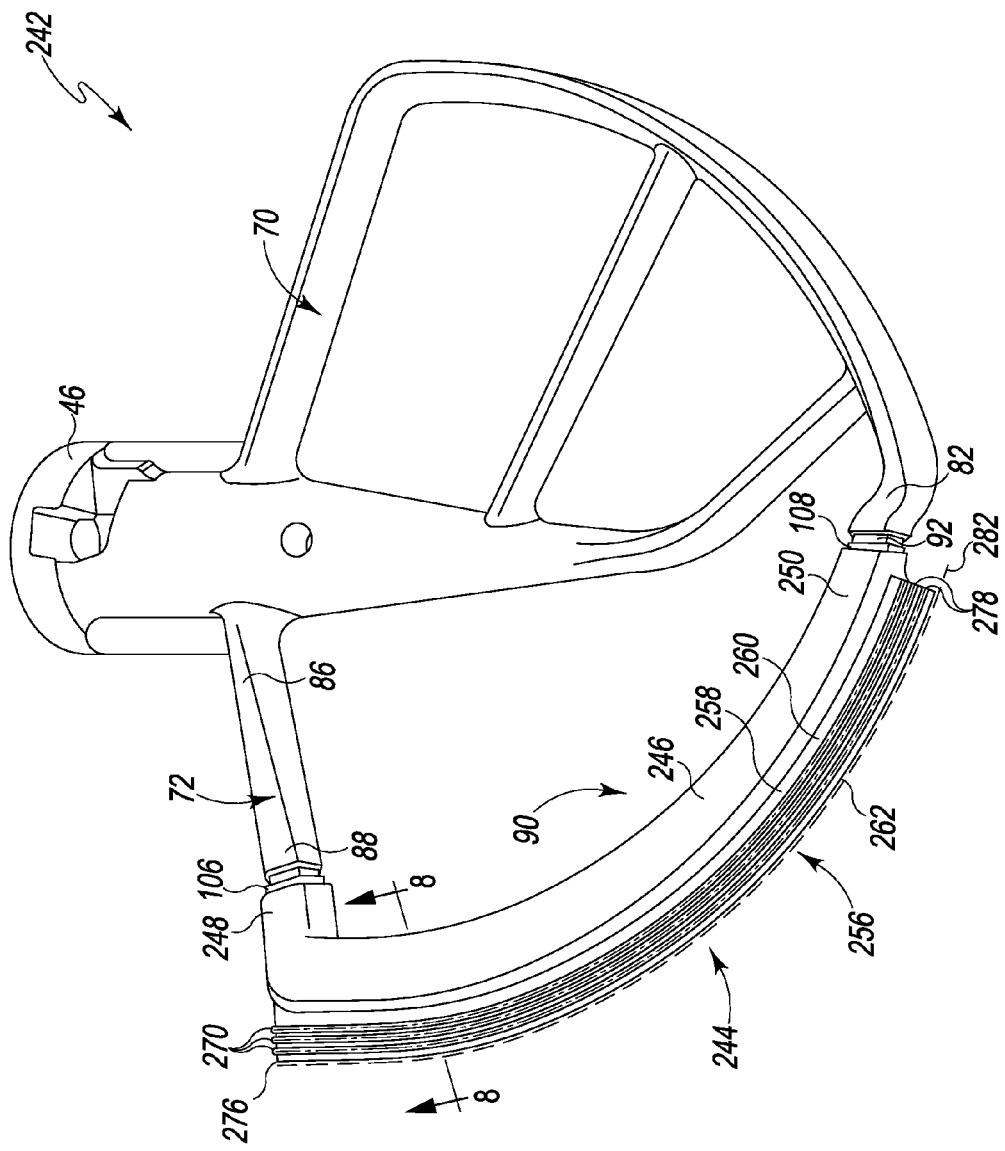
FIG. 7 is a perspective view of another embodiment of the mixing beater.
Figure 8:
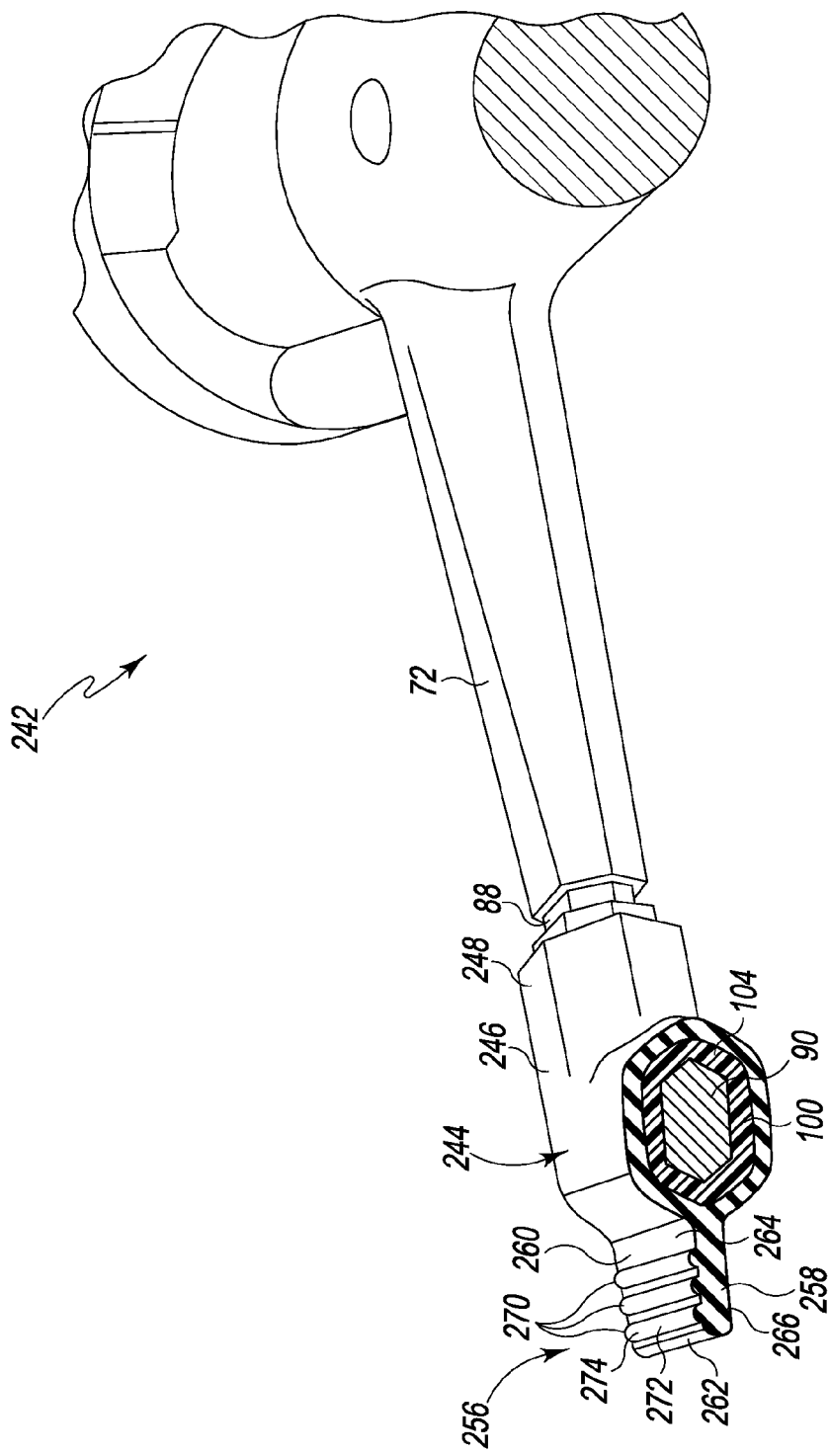
FIG. 8 is a cross-sectional view of the mixing beater taken along the line 8-8 shown in FIG. 7.
Figure 9:
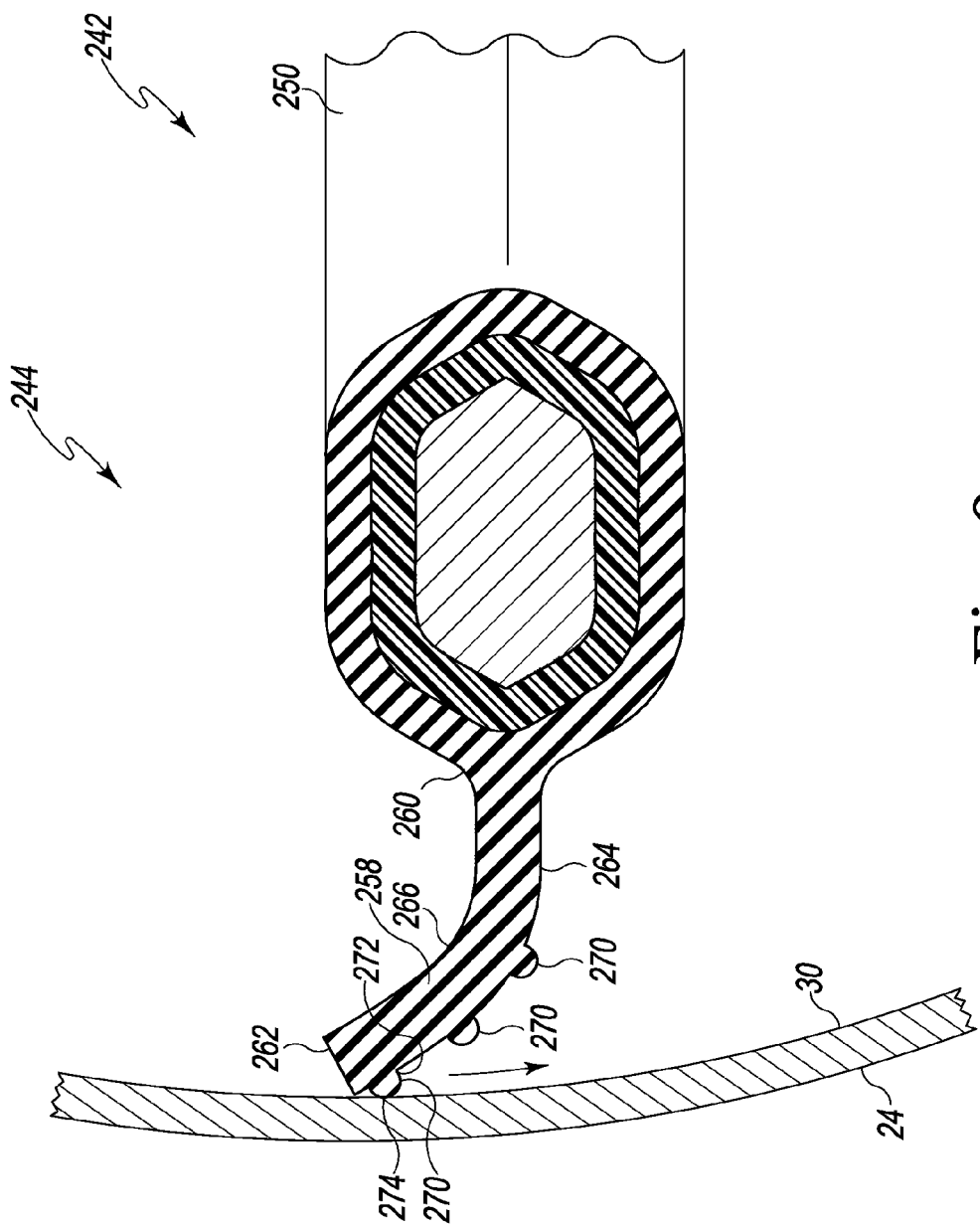
FIG. 9 is a diagrammatic view of the mixing beater of FIG. 7 showing a wiping blade of the mixing beater in contact with the mixing bowl.

Referring now to FIGS. 7-9, a wiping beater 242 is shown. Like the wiping beater 42 shown in FIGS. 1-4, the wiping beater 242 includes a frame 44 having a collar 46 and a pair of arms 70, 72. The arm 72 of the beater 42 includes an upper branch 86 extending outwardly from the collar 46 to an end 88. The arm 72 also includes another branch 90 that extends from the end 88 to a tip 92. As shown in FIG. 7, the tip 92 of the arm 72 is connected to a tip 82 of the other arm 70.

As shown in FIGS. 8 and 9, the beater 242 includes a shell 100 injection molded over the branch 90 of the arm 72. The shell 100 includes a rigid outer casing 104 that is formed on the branch 90, and the casing 104 extends from an upper end 106 positioned adjacent to the end 88 of the upper branch 86 of the arm 72 to a lower end 108 positioned adjacent to the tip 92 of the branch 90.

The shell 100 is positioned between the arm 72 and a scraper 244. The scraper 244 is formed from a thermoplastic elastomer such as, for example, Santoprene™ thermoplastic vulcanizate (TPV), which is commercially available from Exxon Mobil Chemical Company of Houston, Tex., U.S.A. It will be appreciated that in other embodiments other thermoplastic elastomers may be used. The scraper 244 has a cover piece 246 that is secured to the shell 100 and extends over the branch 90 of the arm 72 from an upper end 248 to a lower end 250. The cover piece 246 of the scraper 244 is molded to the shell 100 such that a mechanical bond is formed between the shell 100 and the scraper 244. In that way, the scraper 244 is secured to the frame 44 via the shell 100.

The scraper 244 of the beater 242 includes a wiping blade 256 extending outwardly from the cover piece 246. The wiping blade 256 has a body 258 including a base 260 attached to the cover piece 246 and a curved edge 262. The edge 262 of the blade 256 is shaped to correspond to and follow the inner surface 30 of the mixing bowl 24.

The body 258 of the scraper 244 includes a wiping surface 264 that extends from the base 160 to the edge 262 and another surface 266 opposite the wiping surface 264. A plurality of ribs 270 extend from the wiping surface 264 in a direction away from the surface 266. Each of the ribs 270 is configured to engage the inner surface 30 of the mixing bowl 24 when the scraper 244 is advanced into contact with inner surface 30 of the mixing bowl 24.

As shown in FIG. 8, each rib 270 has a semi-circular cross-section and includes a base 272 attached to the wiping surface 264 and a tip 274 spaced apart from the wiping surface 264. It will be appreciated that in other embodiments the ribs 270 may have rectangular, triangular, or other cross-sectional shapes. In the illustrative embodiment, a total of three ribs 270 are formed on the wiping surface 264. In other embodiments, the wiping surface 264 may include additional or fewer ribs 270.

As shown in FIG. 7, each of the ribs 270 has an upper end 276 and a lower end 278. A curved imaginary line 280 is defined by the tip 274 of each of the ribs 270, and a curved imaginary line 282 defined by the edge 262 of the scraper 244. In the illustrative embodiment, each of the imaginary lines 280 extends parallel to each other and to the imaginary line 282 defined by the edge 262. In that way, each of the ribs 270 is curved to match the curvature of the edge 254. It should be appreciated that in other embodiments the ribs 270 may be angled relative to each other and to the edge 262 or arranged in various patterns on wiping surface 264. Additionally, in other embodiments, additional ribs may be included on the surface 266 of the blade 256.

In use, the complex rotational motion of the beater 242 created by the planetary gear system periodically brings the scraper 244 into contact with inner surface 30 of the mixing bowl 24, thereby deflecting the blade 256, as shown in FIG. 9. When the blade 256 is deflected, one or more the ribs 270 is brought into contact with the inner surface 30. As the beater 242 is rotated, one or more of the ribs 270 passes along a portion of the inner surface 30 to remove food particles from the inner surface 30. This wiping action of the scraper 244 prevents food particles from remaining on the inner surface 30 and enhances the mixing of the foodstuffs within the mixing bowl 24. Because one or more of the ribs 270 contact the inner surface 30 of the mixing bowl 24, the amount of contact between the scraper 244 and the inner surface 30 is minimal, thereby decreasing the amount of friction created between the scraper 244 and mixing bowl 24. The reduced amount of friction reduces the load on the motor 18 of the mixer 10.

Figure 10:
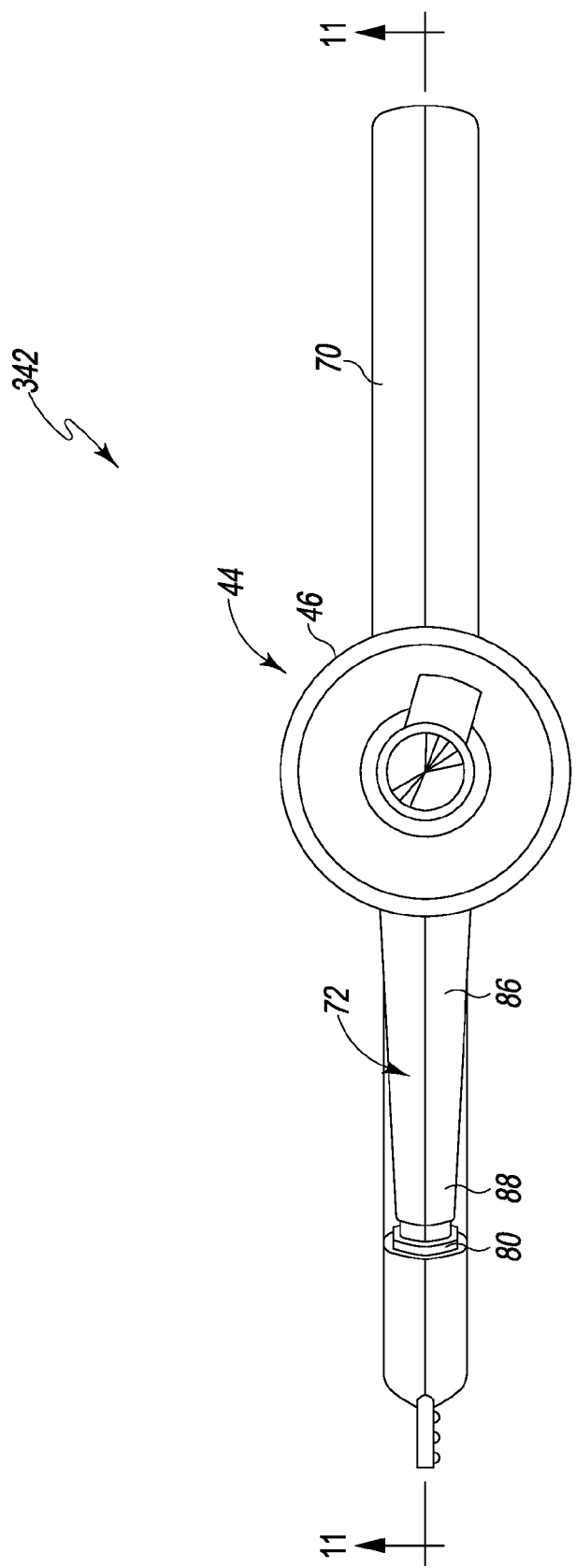
FIG. 10 is a top plan view of another embodiment of a mixing beater.
Figure 11:
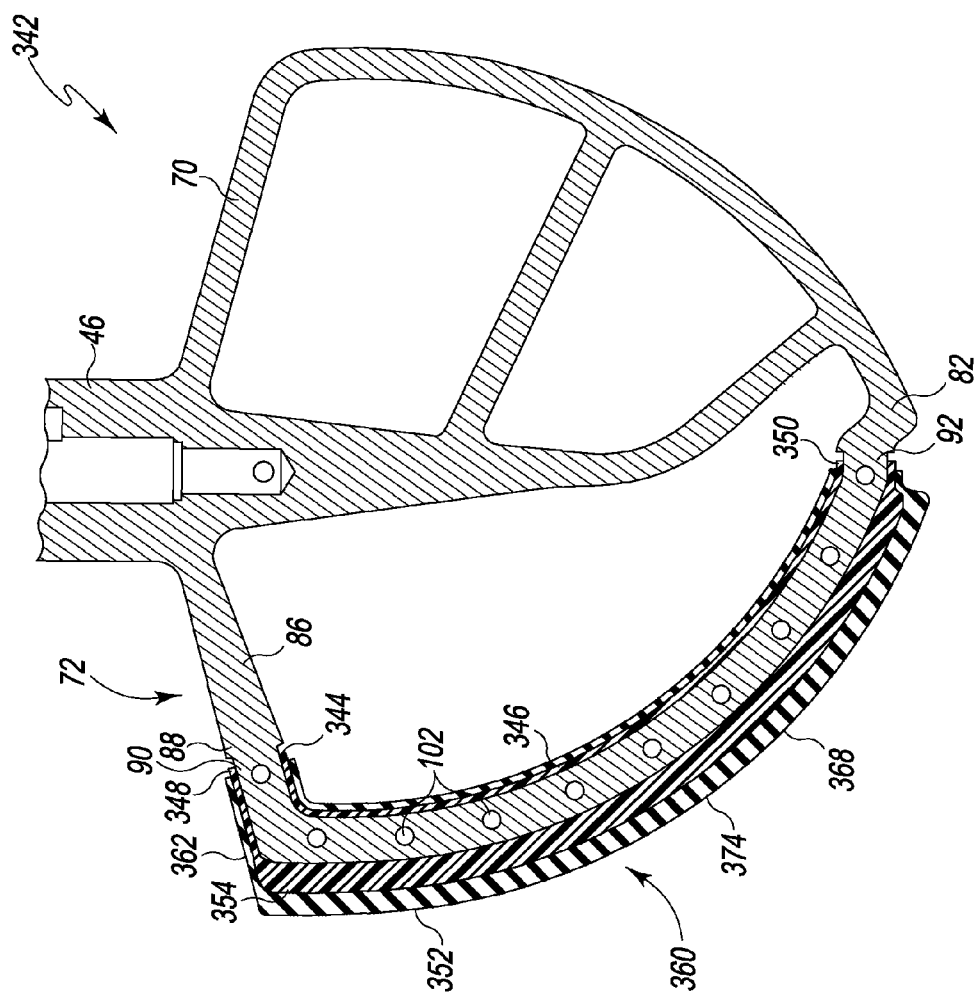
FIG. 11 is a cross-sectional view of the mixing beater taken along the line 11-11 shown in FIG. 10.
Figure 12:
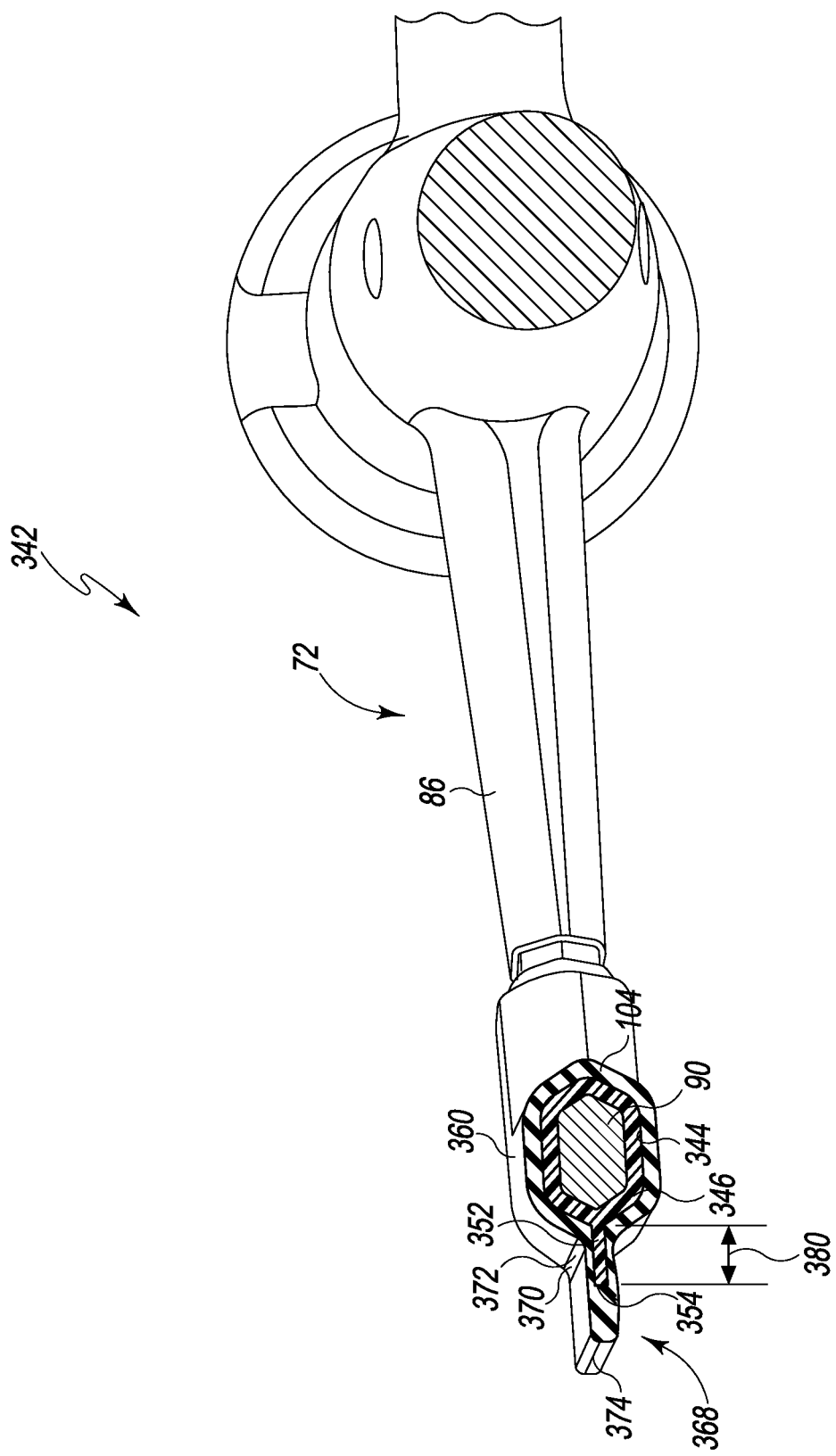
FIG. 12 is a cross-sectional view of the mixing beater of FIGS. 10 and 11.

Referring now to FIGS. 10-12, another embodiment of a mixing beater (hereinafter wiping beater 342) is shown. The wiping beater 342 includes a frame 44 having a collar 46 and a pair of arms 70, 72. The arm 72 of the beater 42 includes an upper branch 86 extending outwardly from the collar 46 to an end 88. The arm 72 also includes another branch 90 that extends from the end 88 to a tip 92. As shown in FIG. 11, the tip 92 of the arm 72 is connected to a tip 82 of the other arm 70.

The beater 342 includes a shell 344 injection molded to the branch 90 of the arm 72. The branch 90 of the arm 72 has a plurality of holes 102 defined therein, and the shell 344 is formed from a polymeric or plastic material that flows over the arm 72 and into the holes 102 during the injection molding process. When the plastic material cools, the rigid outer casing 346 of the shell 344 is formed, and the shell 344 is secured to the arm 72.

The casing 346, like the casing 104 of the shell 100 discussed above in reference to FIGS. 1-4, extends from an upper end 348 positioned adjacent to the end 88 of the upper branch 86 of the arm 72 to a lower end 350 positioned adjacent to the tip 92 of the branch 90. The shell 344 also includes a narrow reinforcement beam 352 extending outwardly from the casing 346 to an edge 354.

The plastic material of the shell 344 is a thermoplastic polymer having sufficient strength and rigidity to withstand the loads applied to the mixing beater 342 during operation. In the illustrative embodiment, the shell 344 is formed from polypropylene. It should be appreciated that in other embodiments the shell may be formed from high density polyethylene (HDPE) or nylon.

As shown in FIGS. 11 and 12, the casing 346 of the shell 344 is positioned between the arm 72 and a scraper 360. The scraper 360, like the scraper 110, is formed from a thermoplastic elastomer. The scraper 360 has a cover piece 362 that is secured to the shell 344 and extends over the branch 90 of the arm 72 from an upper end 364 to a lower end 366. The cover piece 362 of the scraper 360 is molded to the shell 344 such that a mechanical bond is formed between the shell 344 and the scraper 360. In that way, the scraper 360 is secured to the frame 44 via the shell 344.

The scraper 360 includes a wiping blade 368 extending outwardly from the cover piece 362. The wiping blade 368 has a body 370 including a base 372 attached to the cover piece 362 and a curved edge 374. The edge 374 of the blade 368 is shaped to correspond to and follow the inner surface 30 of the mixing bowl 24. As shown in FIGS. 11 and 12, the reinforcement beam 352 of the shell 344 extends into the interior of the blade 368 such that the edge 354 of the reinforcement beam 352 is positioned between the base 372 and the edge 374 of the blade 368. In the illustrative embodiment, the beam 352 has a length 380 that is approximately one-third to one-half of the blade 368. It should be appreciated that in other embodiments the reinforcement beam 352 may extend a greater or lesser amount into the blade 368. Additionally, while the reinforcement beam 352 is shown as a single continuous structure extending along the length of the blade 368, in other embodiments the shell 344 may include multiple beams. It should also be appreciated that in other embodiments the scraper 360 may also include one or more ribs that extend from the blade 368.

In use, the curved edge 374 of the scraper 360 is brought into contact with the inner surface 30 of the mixing bowl 24. The blade 368, like the blades 118, 218, and 248 described above, deflects when the scraper 360 is brought into contact with the inner surface 30 of the mixing bowl 24, and the reinforcement beam 352 deflects with the blade 368. Because the plastic material of beam 352 has greater stiffness than the material of the blade 368, the reinforcement beam 352 resists the deflection and acts as a reinforcing structure to provide additional rigidity along the length of the blade 368. When the scraper 360 is removed from the surface 30 of the bowl 24, the reinforcement beam 352 (and, consequently, the blade 368) returns to its original shape.

Figure 13:
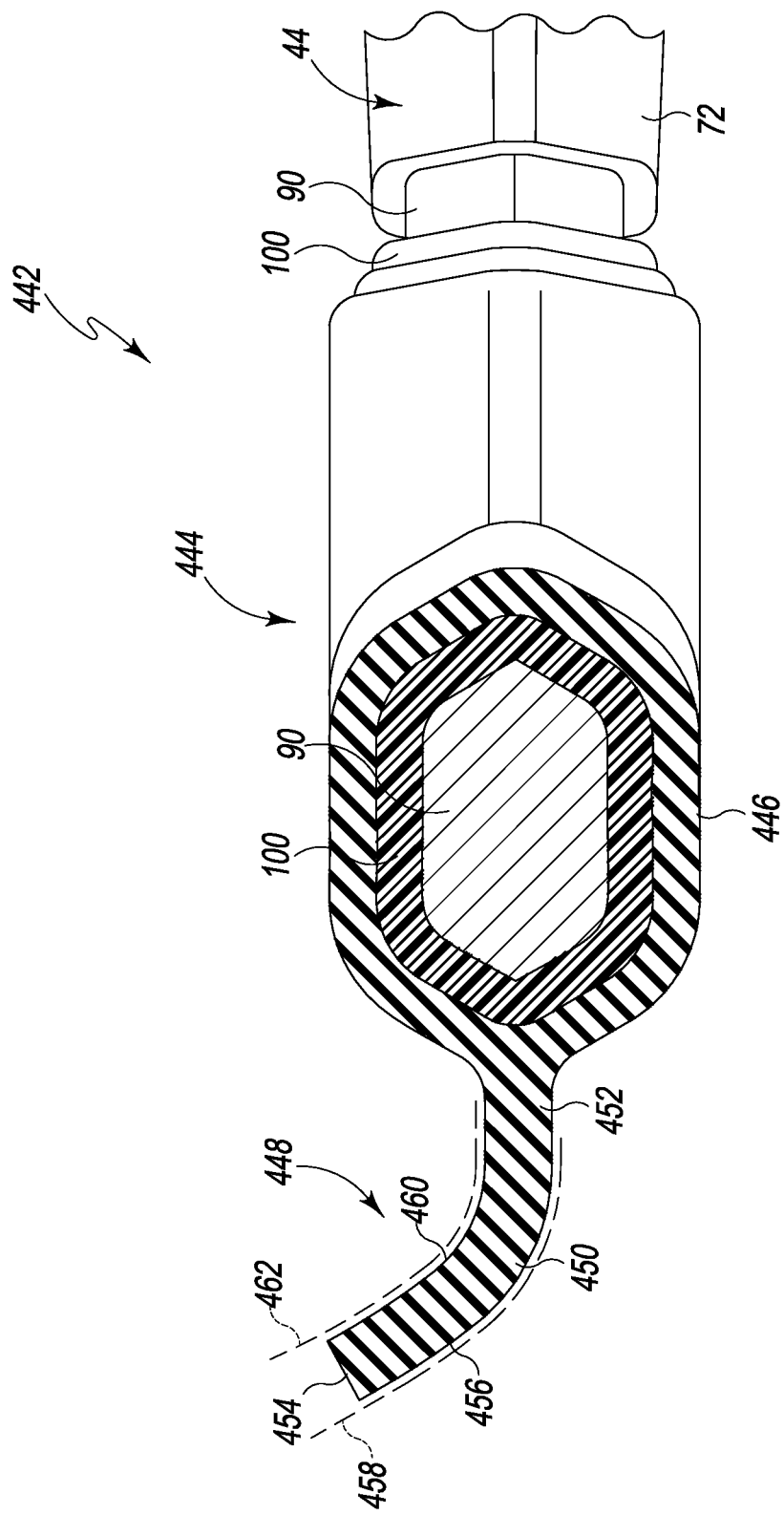
FIG. 13 is a cross-sectional view of another embodiment of the mixing beater.

Referring now to FIG. 13, a cross-section of another embodiment of mixing beater (hereinafter referred to as wiping beater 442) is shown. Like the wiping beater 42 shown in FIGS. 1-4, the wiping beater 442 includes a frame 44 having an arm 72. The arm 72 includes a branch 90 that has a shell 100 injection molded thereto.

A scraper 444 is secured to the arm 72 via the shell 100. The scraper 444, like the scraper 110 of FIGS. 1-4, is formed from a thermoplastic elastomer. The scraper 444 has a cover piece 446 that is secured to the shell 100 and extends over the branch 90 of the arm 72. The scraper 444 also includes a wiping blade 448 extending outwardly from the cover piece 446. The wiping blade 448 has a body 450 including a base 452 attached to the cover piece 446 and an edge 454.

The wiping blade 448 has a wiping surface 456 extending from the base 452 to the edge 454. The edge 454, like the curved edge 124 discussed above in regard to FIGS. 1-4, is curved along its length. As shown in FIG. 13, the scraper 444 is pre-molded or pre-formed such that the body 450 of the blade 448 has a bowed cross-section. The wiping surface 456 is also curved or convex, and the wiping surface 456 defines an arc 458 between the base 452 and the edge 454. The body 450 also includes another surface 460 formed opposite the wiping surface 456, and the surface 460 defines another arc 462 that is concave. The amount of curvature of the surfaces 456, 460 may vary along the length of the blade 448.

Figure 14:
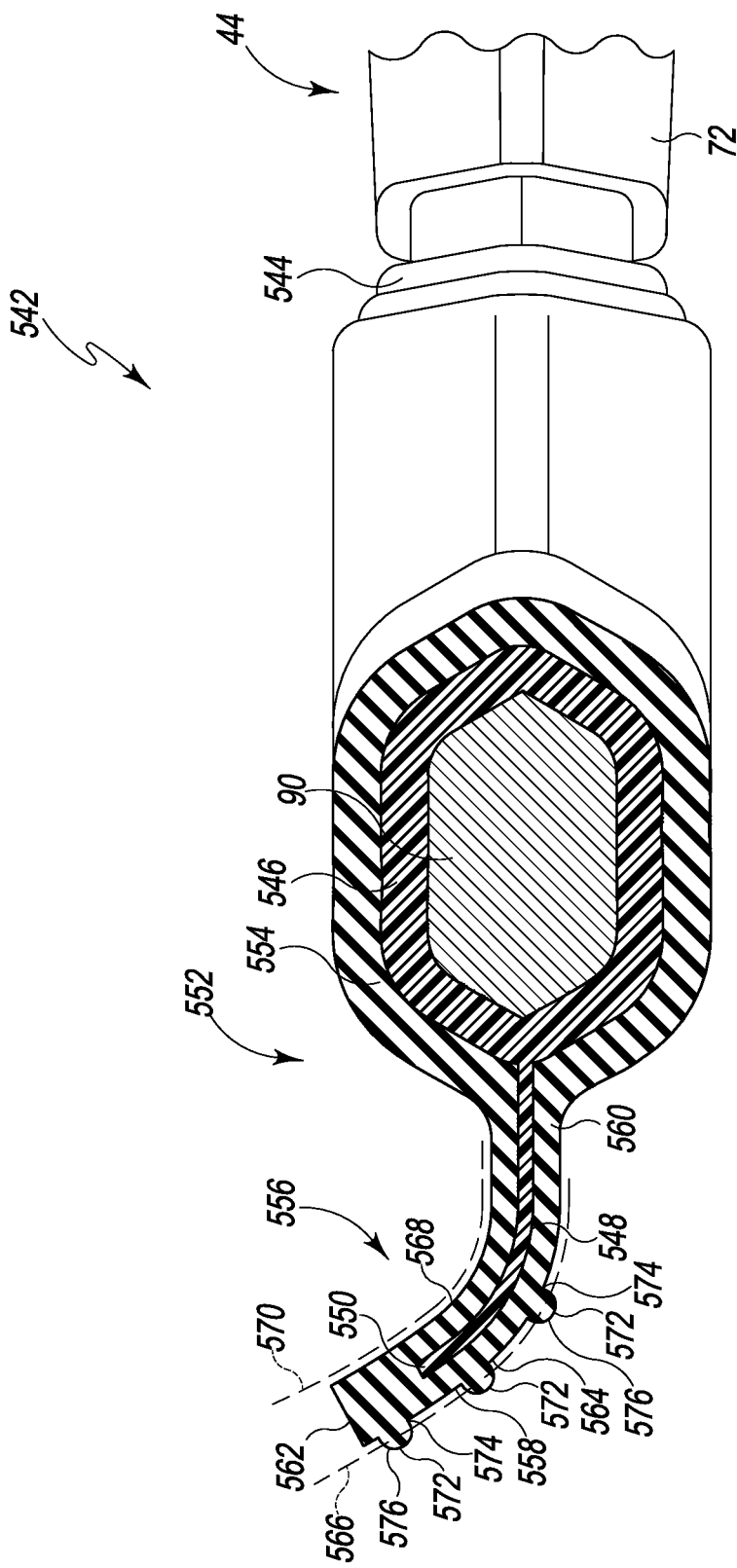
FIG. 14 is a cross-sectional view of another embodiment of the mixing beater.

Referring now to FIG. 14, another embodiment of a mixing beater (hereinafter wiping beater 542) is shown. Like the wiping beater 42 shown in FIGS. 1-4, the wiping beater 542 includes a frame 44 having an arm 72. The arm 72 includes a branch 90 that has a shell 544 injection molded thereto.

The shell 544 includes a casing 546 and a narrow reinforcement beam 548 extending outwardly from the casing 546 to an edge 550. The shell 544 is formed from a polymeric or plastic material, such as, for example, a thermoplastic polymer having sufficient strength and rigidity to withstand the loads applied to the mixing beater 542 during operation. In the illustrative embodiment, the shell 544 is formed from polypropylene. It should be appreciated that in other embodiments the shell may be formed from high density polyethylene (HDPE) or nylon.

A scraper 552 of the wiping beater 542 is secured to arm 72 via the shell 544. The scraper 552 is formed from a thermoplastic elastomer. The scraper 552 has a cover piece 554 that is secured to the shell 544 and extends over the branch 90 of the arm 72. The scraper 552 also includes a wiping blade 556 extending outwardly from the cover piece 554. The wiping blade 556 has a body 558 including a base 560 attached to the cover piece 554 and an edge 562.

The wiping blade 556 has a wiping surface 564 extending from the base 560 to the edge 562. The edge 562, like the curved edge 124 discussed above in regard to FIGS. 1-4, is curved along its length. As shown in FIG. 14, the scraper 552 is pre-molded or pre-formed such that the body 558 of the blade 556 has a bowed cross-section. The wiping surface 564 is also curved or convex, and the wiping surface 564 defines an arc 566 between the base 560 and the edge 562. The body 558 also includes another surface 568 formed opposite the wiping surface 564, and the surface 568 defines another arc 570 that is concave.

The amount of curvature of the surfaces 564, 568 may vary along the length of the blade 556. The shell 544, like the scraper 552, is also pre-molded such that the beam 548 has a bowed cross-section. The edge 550 of the beam 548 is positioned between in the base 560 and the edge 562 of the body 558 of the blade 556.

A plurality of ribs 572, similar to the ribs 270 discussed above in regard to FIGS. 7 and 8, extend from the wiping surface 564 in a direction away from the surface 568. Each of the ribs 572 is configured to engage the inner surface 30 of the mixing bowl 24 when the scraper 552 is advanced into contact with inner surface 30 of the mixing bowl 24.

As shown in FIG. 14, each rib 572 has a semi-circular cross-section and includes a base 574 attached to the wiping surface 564 and a tip 576 spaced apart from the wiping surface 564. It will be appreciated that in other embodiments the ribs 572 may have rectangular, triangular, or other cross-sectional shapes. In the illustrative embodiment, a total of three ribs 572 are formed on the wiping surface 564. In other embodiments, the wiping surface 564 may include additional or fewer ribs 572.

Figure 15:
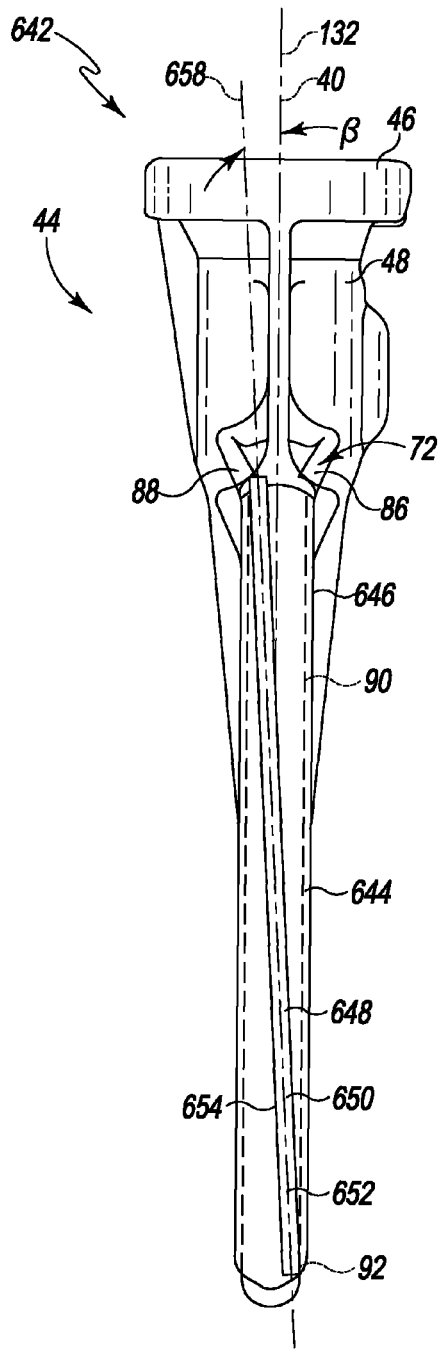
FIG. 15 is a side elevation view of another embodiment of the mixing beater.

Referring now to FIG. 15, another embodiment of a mixing beater (hereinafter wiping beater 642) is shown. The wiping beater 642 has a frame 44 formed from die cast aluminum alloy. The frame 44 includes a collar 46 that is configured to be removably secured to the drive shaft 34 of the mixer head 12. The rotation axis 40 extends downwardly through a central shaft 48 of the collar 46.

The frame 44 also includes an arm 72. The arm 72 includes an upper branch 86 extending outwardly from the collar 46 to an end 88. The arm 72 also includes a branch 90 that extends downwardly from the end 88 to a tip 92. As shown in FIG. 15, a longitudinal axis 132 defined by the branch 90 extends through the arm 72. In the illustrative embodiment, the rotation axis 40 extending through the central shaft 48 is parallel to the longitudinal axis 132 of the arm 72.

The wiping beater 642 also includes a scraper 644 secured to the frame 44 via a shell (not shown) similar to the shell 100 described above in regard to FIGS. 1-4. The scraper 644 has a cover piece 646 that is molded onto the shell such that a mechanical bond is formed between the shell and the scraper 644.

The scraper 644 includes a wiping blade 648 extending outwardly from the cover piece 646. The wiping blade 648 has a body 650 that includes a base (not shown) attached to the cover piece 646 and a curved edge 652. The edge 652 of the blade 648 is shaped to correspond to and follow the inner surface 30 of the mixing bowl 24. The body 650 of the blade 648 has a wiping surface 654 that extends from the base to the edge 652.

The edge 652 of the blade 648 defines a longitudinal axis 658 that is angled relative to the longitudinal axis 132 of the arm 72. An angle β is defined between the axis 658 of the blade 648 and the axes 40, 132 of the central shaft 48 and arm 72, respectively. The magnitude of the angle β is approximately four degrees. In that way, the blade 648 is angled relative to the arm 72. In use, because the blade 648 is angled downward, food particles are pushed down and toward the center of the mixing bowl 24.

Figure 16:
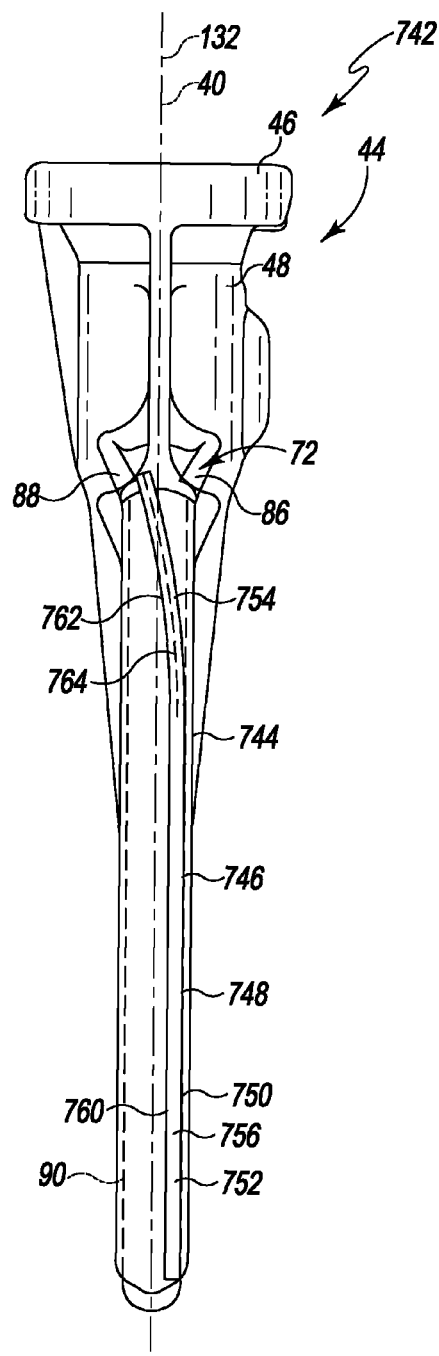
FIG. 16 is a side elevation view of another embodiment of the mixing beater.

Referring now to FIG. 16, another embodiment of a mixing beater (hereinafter wiping beater 742) is shown. The wiping beater 742 has a frame 44 formed from die cast aluminum alloy. The frame 44 includes a collar 46 that is configured to be removably secured to the drive shaft 34 of the mixer head 12. The rotation axis 40 extends downwardly through a central shaft 48 of the collar 46.

The frame 44 of the wiping beater 742 also includes an arm 72. The arm 72 includes an upper branch 86 extending outwardly from the collar 46 to an end 88. The arm 72 also includes a branch 90 that extends downwardly from the end 88 to a tip 96. As shown in FIG. 16, a longitudinal axis 132 defined by the branch 94 extends through the arm 72. In the illustrative embodiment, the rotation axis 40 extending through the central shaft 48 is parallel to the longitudinal axis 132 of the arm 72.

The wiping beater 742 also includes a scraper 744 secured to the frame 44 via a shell (not shown) similar to the shell 100 described above in regard to FIGS. 1-4. The scraper 744 has a cover piece 746 that is molded onto the shell such that a mechanical bond is formed between the shell and the scraper 744.

The scraper 744 includes a wiping blade 748 extending outwardly from the cover piece 746. The wiping blade 748 has a body 750 that includes a base (not shown) attached to the cover piece 746 and an outer edge 752. The edge 752 of the blade 748 is shaped to correspond to and follow the inner surface 30 of the mixing bowl 24.

The body 750 includes an upper body section 754 and a lower body section 756. The lower body section 756 includes a lower wiping surface 760 that is substantially planar, as shown in FIG. 16, and extends substantially parallel to the axes 40, 132 of the central shaft 48 and arm 72, respectively. The upper body section 754 has an upper wiping surface 762 that defines an arc 764 that extends from a lower end 766 to an upper end 768. As shown in FIG. 16, the arc 764 is concave or curved downward such that when the beater 742 is positioned in the mixing bowl 24, the upper wiping surface 762 will face the bottom of the bowl 24. In use, because the upper body section 754 of the blade 748 is curved downward, food particles are pushed down and toward the center of the mixing bowl 24.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, the reinforcement beam expressly described in regard to some embodiments may be incorporated into one of the other embodiments described above.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A mixing beater for a stand mixer, comprising:
a metallic frame including an arm,
a plastic shell extending over the arm, and
only one scraper, the one scraper including a cover piece extending over the plastic shell and a wiping blade extending from the cover piece, the wiping blade being configured to contact an inner surface of a mixing bowl,
wherein the wiping blade includes (i) a base secured to the cover piece, (ii) a curved outer edge spaced apart from the base, (iii) a first surface extending between the base and the curved outer edge, and (iv) a rib extending outwardly from the first surface.

2. The mixing beater of claim 1, wherein the wiping blade includes at least three ribs extending from the first surface.

3. The mixing beater of claim 1, wherein the rib has a semi-circular cross-section.

4. The mixing beater of claim 1, wherein the curved outer edge of the wiping blade defines a first imaginary curve when the mixing beater is viewed in a first plane, and the rib includes a tip that defines a second imaginary curve extending parallel to the first imaginary curve when the mixing beater is viewed in the first plane.

5. The mixing beater of claim 4, wherein:
the metallic frame includes a central shaft having the arm attached thereto, the central shaft being configured to be coupled to the stand mixer,
a first longitudinal axis extends through the central shaft and a second longitudinal axis extends through the wiping blade, and
an angle is defined between the first longitudinal axis and the second longitudinal axis when the mixing beater is viewed in a second plane that extends orthogonal to the first plane.

6. The mixing beater of claim 5, wherein the angle is substantially zero degrees when the mixing beater is viewed in the second plane.

7. The mixing beater of claim 5, wherein the angle has a magnitude that is greater than zero degrees.

8. The mixing beater of claim 7, wherein a third longitudinal axis extends through the arm of the metallic frame, and the third longitudinal axis extends parallel to the first longitudinal axis when the mixing beater is viewed in the second plane.

9. The mixing beater of claim 1, wherein the plastic shell includes:
a casing positioned within the cover piece of the one scraper, and
a beam extending from the casing, the beam having an edge positioned within the wiping blade.

10. The mixing beater of claim 1, wherein the wiping blade includes a pre-molded body that has a bowed cross-section.

11. The mixing beater of claim 1, wherein the one scraper is formed from a thermoplastic elastomer.

12. The mixing beater of claim 1, wherein the plastic shell is formed from polypropylene.

13. The mixing beater of claim 1, wherein the metallic frame is formed from aluminum.

14. A mixing beater for a stand mixer, comprising:
a metallic frame including an arm,
a plastic shell including (i) a casing encompassing the arm and (ii) a beam that extends from the casing, and
a scraper including a cover piece that encompasses the casing of the plastic shell and a wiping blade that extends from the cover piece, the wiping blade having a first surface configured to contact an inner surface of a mixing bowl,
wherein the beam has an edge positioned within the wiping blade to reinforce the wiping blade.

15. The mixing beater of claim 14, wherein:
the wiping blade includes a pre-molded body having a base attached to the cover piece and an outer edge, and
the edge of the beam is positioned between the base and the outer edge of the wiping blade.

16. A mixing beater for a stand mixer, comprising:
a metallic frame including an arm,
a plastic shell including (i) a casing extending over the arm and (ii) a beam that extends from the casing, and
a scraper including a cover piece that the casing of the plastic shell and a wiping blade that extends from the cover piece, the wiping blade having a first surface configured to contact an inner surface of a mixing bowl,
wherein the beam has an edge positioned within the wiping blade to reinforce the wiping blade,
wherein the wiping blade includes a pre-molded body having a base attached to the cover piece and an outer edge,
wherein the edge of the beam is positioned between the base and the outer edge of the wiping blade, and
wherein the pre-molded body has a bowed cross-section.

17. The mixing beater of claim 16, wherein the wiping blade includes a plurality of ribs extending outwardly from the first surface.

18. A mixing beater for a stand mixer, comprising:
a metallic frame including an arm,
a plastic shell including (i) a casing extending over the arm and (ii) a beam that extends from the casing, and
a scraper including a cover piece that the casing of the plastic shell and a wiping blade that extends from the cover piece, the wiping blade having a first surface configured to contact an inner surface of a mixing bowl,
wherein the beam has an edge positioned within the wiping blade to reinforce the wiping blade, and
wherein the wiping blade has a lower body and an upper body, the upper body defining an arc such that a section of the first surface is concave when the mixing beater is viewed in a first plane.

19. A mixing beater for a stand mixer, comprising:
a metallic frame including a central shaft configured to be coupled to the stand mixer and an arm attached to the central shaft,
a plastic shell extending over the arm, and
a scraper extending over the plastic shell, the scraper including a wiping blade,
wherein (i) a first longitudinal axis extends through the central shaft, a second longitudinal axis extends through the wiping blade, and a third longitudinal axis extends through the arm, (ii) an angle having a magnitude greater than zero degrees is defined between the first longitudinal axis and the second longitudinal axis when the mixing beater is viewed in a first plane, and (iii) the first longitudinal axis extends parallel to the third longitudinal axis.

20. The mixing beater of claim 19, wherein the plastic shell includes:
a casing positioned within the scraper, and
a beam extending from the casing, the beam having an edge positioned within the wiping blade.

* * * * *